Sept. 18, 1934.   E. P. GUNDRY   1,973,853
FENDER WELL TIRE CARRIER
Filed April 3, 1933

Inventor
Eldon P. Gundry
By Blackmore, Spencer & Flint
Attorneys

Patented Sept. 18, 1934

1,973,853

UNITED STATES PATENT OFFICE 1,973,853

FENDER WELL TIRE CARRIER

Eldon P. Gundry, Flint, Mich., assignor to General Motors Corporation, Detroit, Mich., a corporation of Delaware Application April 3, 1933, Serial No. 664,126

4 Claims. (Cl. 224—29)

This invention relates to motor vehicles, and more particularly to the mounting of spare or extra tires.

The invention has for its object to provide an improved carrier of the fender well type, in which the mounting attachments, although easily accessible, are hidden from view, offer no interference to the use of tire covers and firmly hold the tire assembly in place.

In a preferred embodiment of the invention the attachment parts involve a rigidly anchored post extending upwardly from the well and having slidably mounted near its upper and lower ends the opposite extremities of a mounting bar, which engages intermediate its ends with the wheel hub of the spare tire assembly and is movable toward and away from the well for removably clamping therein the tire assembly. By the engagement of the supporting rod and mounting bar at two widely spaced apart points, an exceptionally sturdy construction is afforded.

Figure 1:
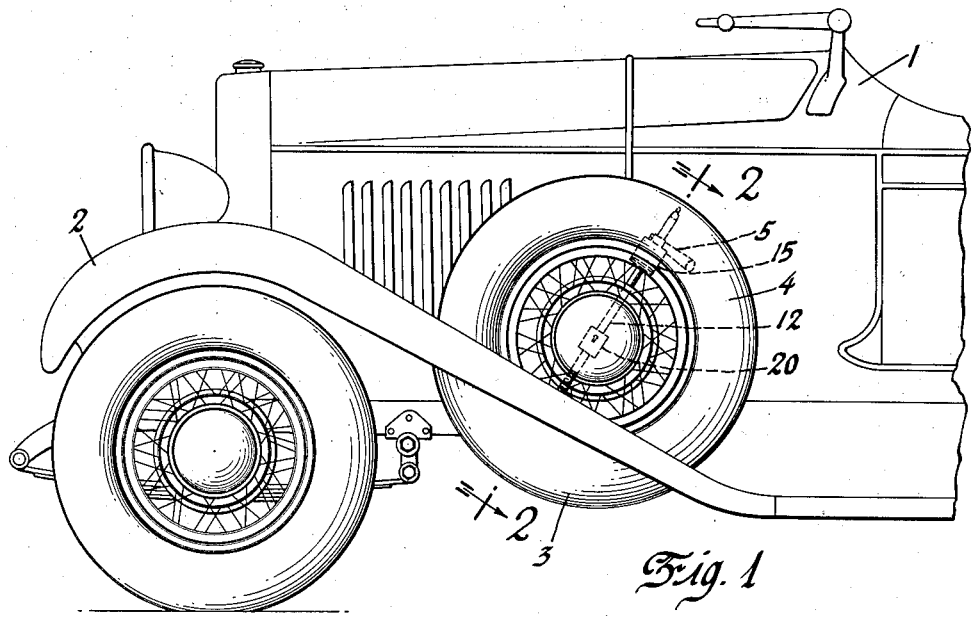
Figure 2:
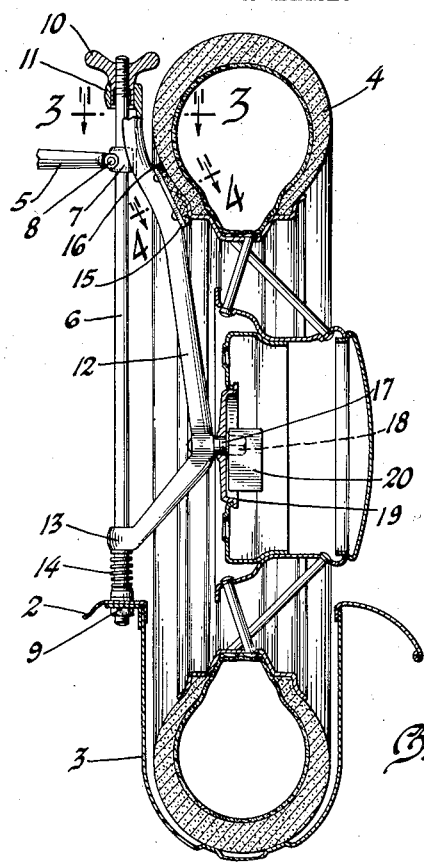
Figure 3:
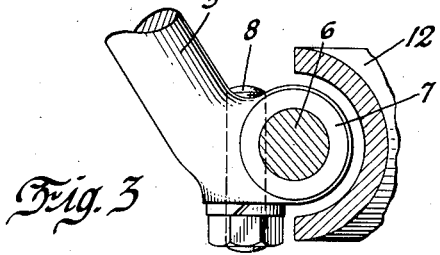
Figure 4:
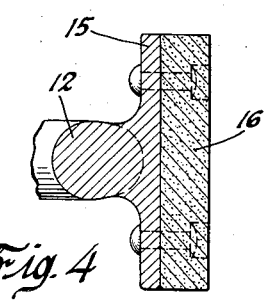

For a better understanding of the invention, reference may be made to the accompanying drawing, wherein Figure 1 is a side elevation of a portion of a motor vehicle, showing a spare tire assembly mounted in the fender well. Figure 2 is a transverse section through the fender well on line 2—2 of Figure 1, and Figures 3 and 4 are detail sectional views taken on lines 3—3 and 4—4, respectively, of Figure 2.

Referring to the drawing, reference numeral 1 indicates the motor vehicle body, with which is associated a front fender or mud guard 2, having a pocket or well 3, formed therein, for the reception of the spare tire. The spare tire 4 includes as an assembly the inflatable tire casing and its supporting rim or wheel.

Extending laterally from the vehicle body 1 is a brace rod 5 for the upper end of a tensionable rod 6 extending upwardly from the fender 2 on the vehicle side of the fender well. The connection between the rods 5 and 6 may involve an integral eye 7, receiving the rod 6, together with a key stud 8 extending through one side of the eye and seating in a notched portion of the rod 6. The ends of the stud 8 may be peened over to hold it in place. At its lower end the rod 6 is suitably anchored to the fender 2, as by means of a nut 9 threaded thereon and prevented from removal by subsequent distortion of the threads.

A wing nut 10, threaded on the upper end of the rod 6, is shown with a skirt portion received within an eye 11 on the upper end of an outwardly bowed mounting bar 12, whose opposite terminal 13 is also apertured and slidable on the rod 6 near its anchorage on the fender 2. A coil spring 14 is preferably interposed between the eye 13 and fender for anti-rattle purposes. Just below the eye 11 the mounting bar 12 is provided with a plate-like enlargement or pad 15, to which is riveted or otherwise secured a cushion 16 of felt, rubber or the like, to engage an adjacent side of the tire assembly opposite that received within the well 3. At a suitable intermediate point, the bar 12 is provided with a laterally projecting stud 17, which extends into the interior of the hollow wheel hub forming a part of the spare tire assembly 4. A screw threaded nut 18 on the stud 17 holds in place a clamping plate 19, which engages the wheel attaching flange of the hub, and securely clamps the upper portion of the wheel against the pad 15 and to the mounting bar 12. To prevent theft or unauthorized removal of the spare tire, a suitable lock 20 may be provided to preclude access and manipulation of the fastening nut 18.

When the parts are in tire carrying relation, the thumb nut 10 on the rod 6 exerts a downward pressure on the bar 12, which through its engagement with the spare wheel assembly, holds the same tightly in the fender. To remove the wheel, the nut 10 is first backed up, after which the removal of the nut 18 and clamping plate 19 frees the wheel so that it may be lifted out of the well. The reverse procedure is followed in replacing the wheel.

From the above description, it will be seen that the attachment of the mounting bar 12 at both ends to the upright rod 6 near the anchored portions of the rod will afford an extremely sturdy mounting. With the clamping effected on the hub, there are no obstructions offered to the application over the tire tread of conventional tire covers. In addition, a very neat and clean appearance is presented, since the mounting parts are wholly concealed behind the spare wheel and by the usual hub cap, which is removably positioned over the outer end of the hollow hub.

I claim:

1. Means to carry a spare tire and wheel assembly, including a tire receiving well, an outwardly bowed bar extending in a vertical plane above the well and having apertured end portions at the top and bottom thereof, means intermediate the ends of the bowed bar for detachably securing thereto a wheel hub, a tensionable rod projecting upwardly from the well and through both of said apertured portions, and pressure exerting means between the upper ends of the rod and bar to move the bar downwardly on the rod toward the well and clamp the assembly at its hub against removal from the well.

2. Means to carry a spare tire and wheel assembly, including a tire receiving well, a bar extending upwardly beside the well and having opposite ends mounted for movement of the bar toward and from the well, means for exerting downward pressure on the bar, a pad carried by the bar near its upper end for engagement with the side of a tire assembly and wheel hub engaging means associated with an intermediate portion of the bar for clamping the assembly against the pad.

3. In combination, a fender having a well to receive a spare tire assembly, a tensionable rod extending upwardly from the fender at one side of the well to adjacent the top of a tire positioned in the well, an outwardly bowed member slidably engaging at opposite ends the opposite ends of the rod and extending outwardly and over the well, a pad adjacent the upper end of the member for engagement with the inner side of the tire, means detachably securing the hub of the spare tire assembly to the outward bow of the member and clamping the tire inwardly against the said pad, and adjustable means at the upper ends of the rod and member for tensioning the rod and moving the member downwardly to clamp the tire against the bottom of the well.

4. In combination, a fender having a well to receive a spare tire, a tensionable rod extending upwardly from the fender beside the well to adjacent the upper end of the tire, a substantially V-shaped member having the spaced ends of its divergent legs slidably engageable with the top and bottom of said rod and its legs extending laterally from the rod and above the well, means for detachably securing the hub of the spare tire assembly to said legs at their point of divergence, and an adjustable element at the upper end of the rod for moving the member downwardly to clamp the tire against the bottom of the well.

ELDON P. GUNDRY.